United States Patent [19]

Van Hoose

[11] Patent Number: 4,917,607
[45] Date of Patent: Apr. 17, 1990

[54] DOLL FOR FACILITATING THERAPEUTIC COMMUNICATION AND ATTITUDINAL HEALING

[76] Inventor: Sandra S. Van Hoose, Rt. 2 Box 313-C, Federalsburg, Md. 21632

[21] Appl. No.: 250,698

[22] Filed: Sep. 29, 1988

[51] Int. Cl.⁴ .................. G09B 19/00; A63H 3/02
[52] U.S. Cl. ................... 434/236; 446/295; 446/369
[58] Field of Search ............ 446/295, 296, 268, 369; 434/272, 267, 270, 262, 236

[56] References Cited

U.S. PATENT DOCUMENTS

| 2,678,505 | 5/1954 | Munson | 434/272 |
| 2,959,891 | 11/1960 | Barnett et al. | 446/295 |
| 4,288,222 | 9/1981 | Kling | 446/369 X |
| 4,762,494 | 8/1988 | Woods | 434/270 X |

Primary Examiner—Mickey Yu
Attorney, Agent, or Firm—Foley & Lardner, Schwartz, Jeffrey, Schwaab, Mack, Blumenthal & Evans

[57] ABSTRACT

The disclosure describes an apparatus and method for facilitating therapeutic communication of human emotions, for attitudinal healing, or for everyday play. A rag type doll has built-in cavities for receiving fabric forms connoting human feelings and other fabric forms representing different body parts and attributes. The cavities are located on the doll to show where on the body such feelings are experienced by inserting the appropriate form into the cavity. Thus, the user of the doll communicates to a therapist thought connections between mind and body in order to facilitate treatment.

29 Claims, 5 Drawing Sheets

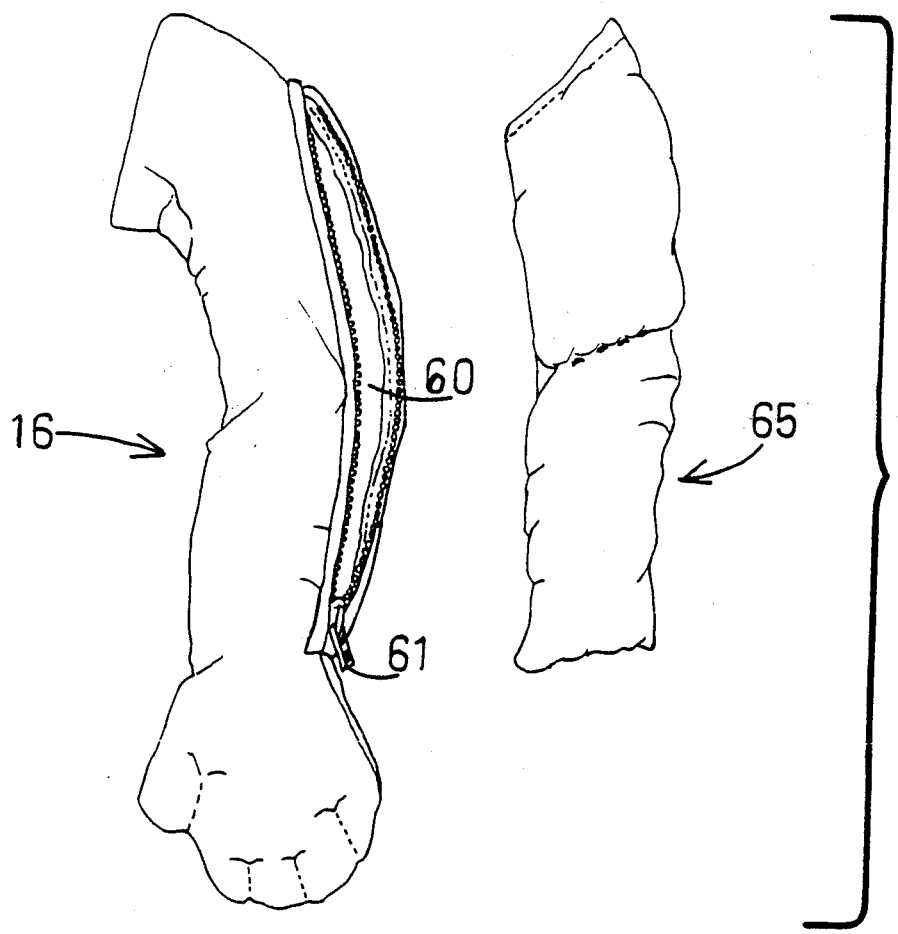
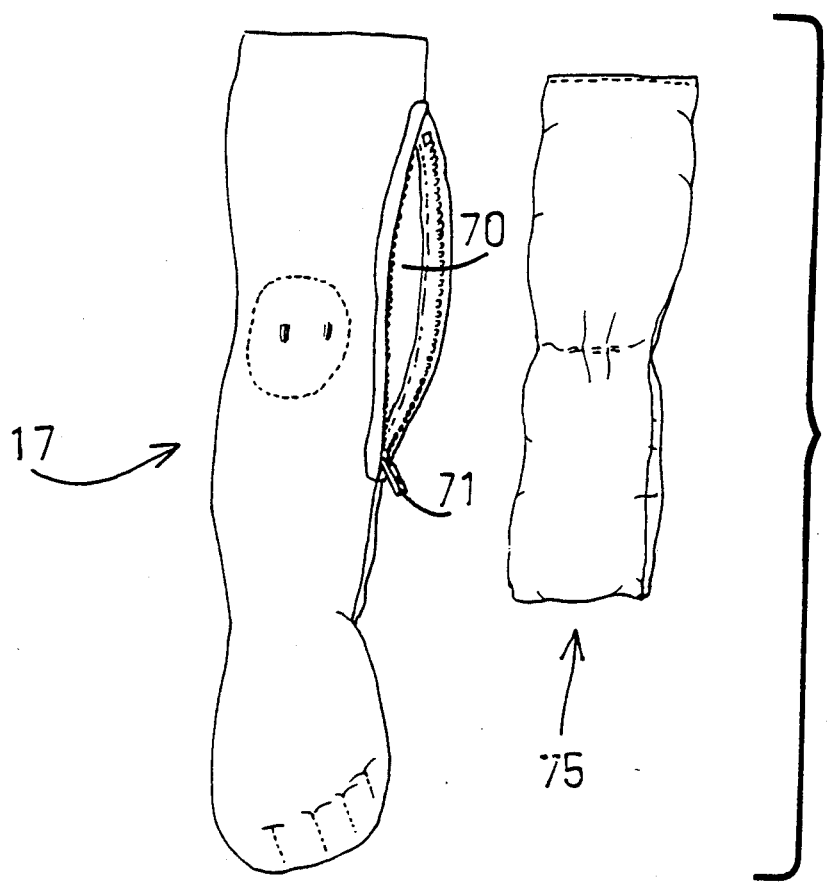

DOLL FOR FACILITATING THERAPEUTIC COMMUNICATION AND ATTITUDINAL HEALING

BACKGROUND OF THE INVENTION

The invention is derived from the need to develop constructive therapeutic diagnostic tools for children, whose use may lead to improved mental and physical health. While the doll is suitable for play or entertainment purposes, the primary purpose is as a diagnostic tool.

Children need to learn to understand and communicate their feelings in a comfortable, attracting way. Unexpressed feelings or emotions may lead some children to experience psychosomatic symptoms or illness just as adults do.

If an adult is having difficulty with his business, he may suffer physical symptoms of stress, such as ulcers, headaches, and other stress induced illnesses. It is not as easy to recognize illness as being stress related in children. Many parents are not skilled in knowing how to communicate to a child in such a way as to let the child be able to fully express his feelings in a safe, comforting way. Therefore, unexpressed feelings of anger, fear, or confusion, etc. can cause children to exhibit similar stress symptoms; bellyache, headache, etc.

The doll may assist a parent or therapist to help children communicate the thoughts and anxiety causing these stress symptoms, and in many cases, eliminate the symptom.

SUMMARY OF THE INVENTION

The present invention is a soft sculptured fabric body (rag type) doll consisting of hollow cavities accessible by means of zipper-closed openings located in the head, torso, arms and legs. These openings allow access to the inner parts of the doll consisting of fabric shapes and forms representing emotions or feelings and the locations within the body where emotions or feelings can be stored; the mind, the belly, the heart, the memory, the imagination and the arms and legs.

The invention contains printed cards that are located in the heart. These cards have questions designed to aid a child or an adult in communicating any unexpressed feelings or emotions which they may have placed in the body, in the form of pain or discomfort. Within the imagination are bandages which may assist in the psychological process of healing.

This invention is primarily designed to be used for attitudinal healing in a therapeutic setting, however it is completely suitable for play and entertainment purposes in any and all settings. Such a tangible, visual aid is most helpful in teaching, understanding and communicating the possible causes of psychosomatic symptoms or illness.

The foregoing and other objects, features and advantages of the invention will be apparent from the following more particular description of the preferred embodiment of the invention as illustrated in the accompanying drawings.

BRIEF DESCRIPTION OF THE DRAWINGS

FIG. 5a is an exploded frontal elevation of the left arm with the cavity open and contents removed therefrom FIG. 5b is an exploded frontal elevation of the left arm with the cavity and contents removed therefrom.

DETAIL DESCRIPTION OF THE INVENTION

Figure 1:
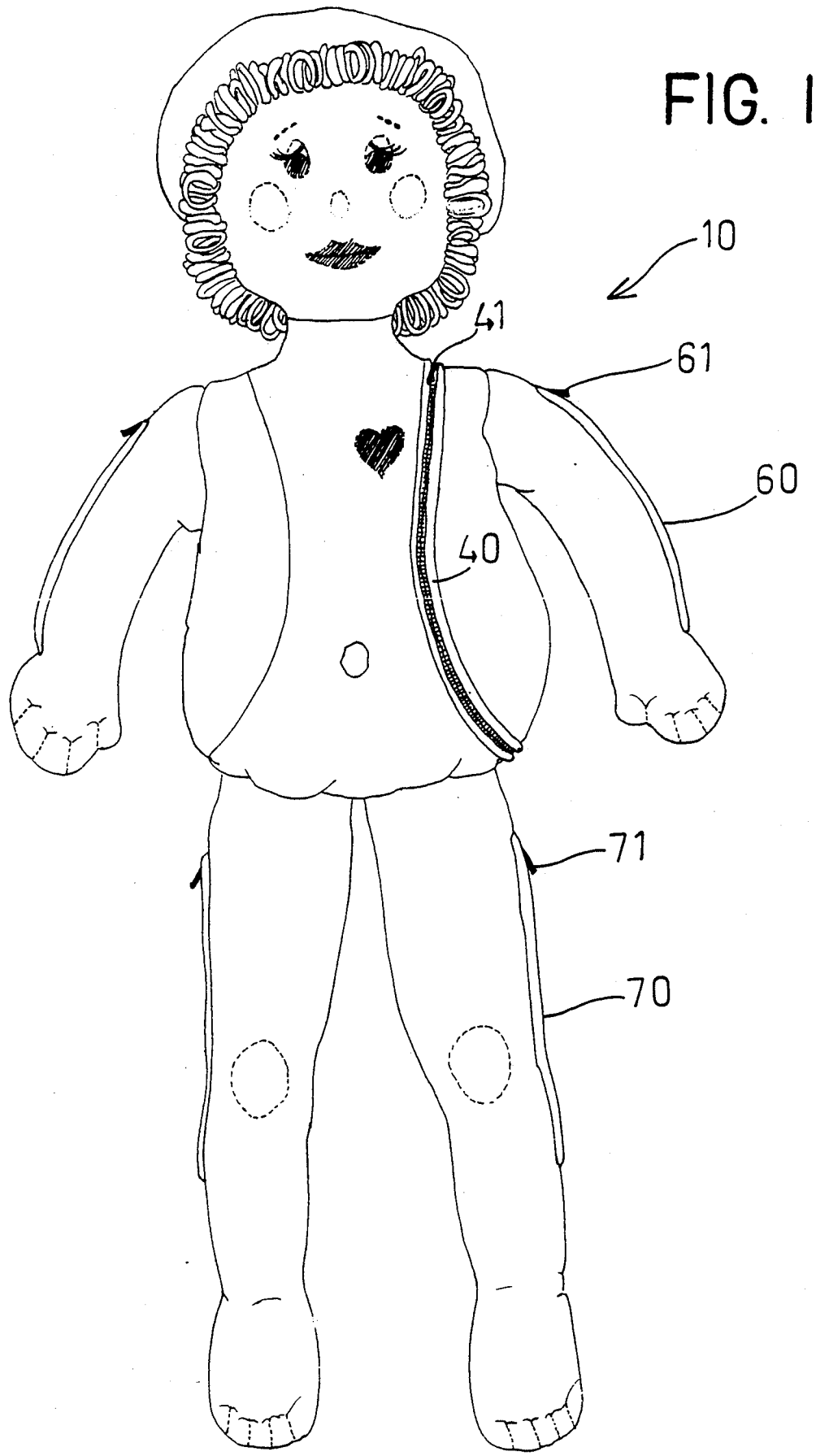
FIG. 1 is a front elevational view of the doll showing all zippered enclosures
Figure 2:
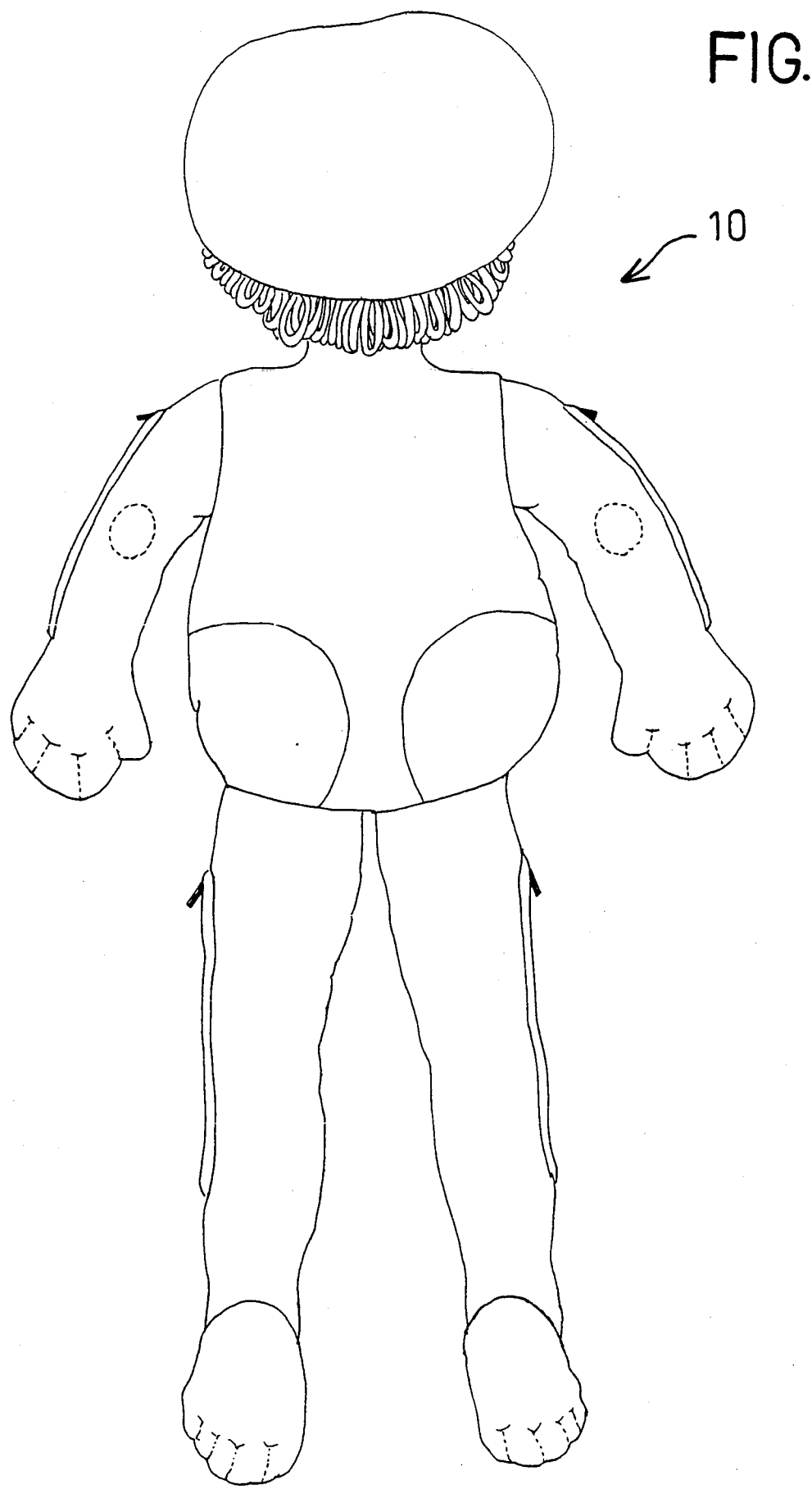
FIG. 2 is a back elevational view of the doll

The doll, as shown in FIG. 1 and FIG. 2 is constructed as a soft sculptured, fabric body rag doll. The doll 10 is a shell with closeable openings which allow access to the hollow body cavities in the head, torso, arms and legs. The openings may be closed by a zipper or any other suitable closure, means such as snap fasteners, buttons, fabric fasteners, such as VELCRO TM strips or the like. The outfits it may be clothed in are representative of the child's friends and playmates.

Figure 3:
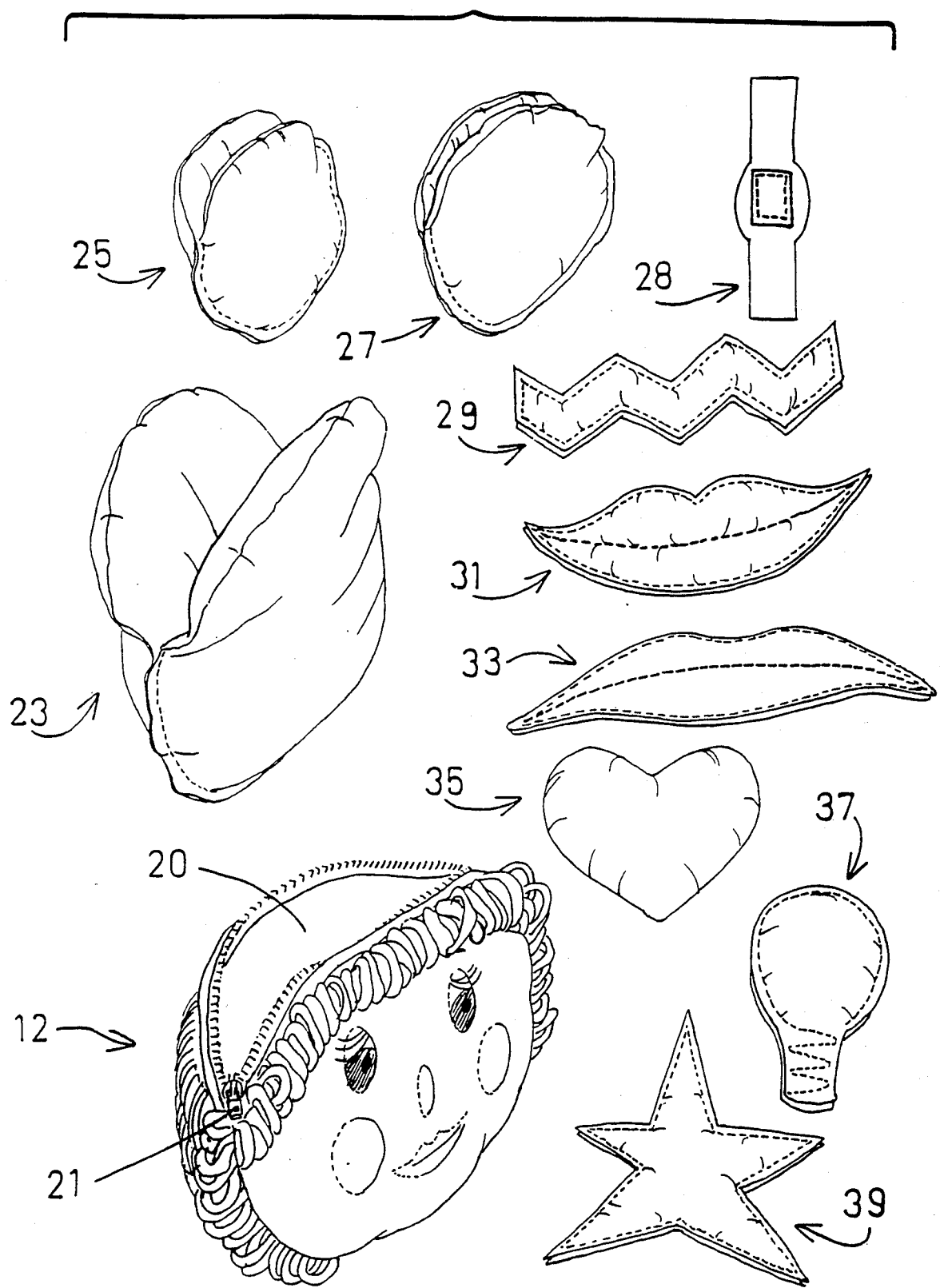
FIG. 3 is an exploded perspective view of the head of the doll with cavity open and all of the contents removed therefrom

As seen in FIG. 3, the dolls head 12 has an open cavity 20 that is accessed by a zipper 21. The primary purpose for this is to expose the contents. The first object is a large, blue fabric pocket type sack 23. This object represents the mind 23. Within this mind sack 23 are two other pocket sacks. One fabric pocket sack is orange 25, this represents the memory. In the memory 25 representative objects of the past may be stored. The other fabric pocket sack is purple 27, this represents the imagination. The imagination 27 contains objects that are flesh colored strips of fabric with the center being of a gold color fabric 28. These represent bandages 28. Within the mind sack 23 are fabric shaped objects representing the emotions or feelings 29 to 39. One of these representations is best described as a black lightning bolt 29 which may represent the emotion or feeling of anger, fear, confusion, anxiety or worry. Another representation would be described as red smiling lips 31 which represents joy. The gray fabric frown 33 represents sadness, unhappiness, confusion or worry. The small red fabric heart 35 represents love, good feelings, caring and compassion. The white fabric light bulb shape 37 represents ideas and thinking. The blue fabric freeform star shape 39 represents inspiration or any unidentified feelings.

Figure 4:
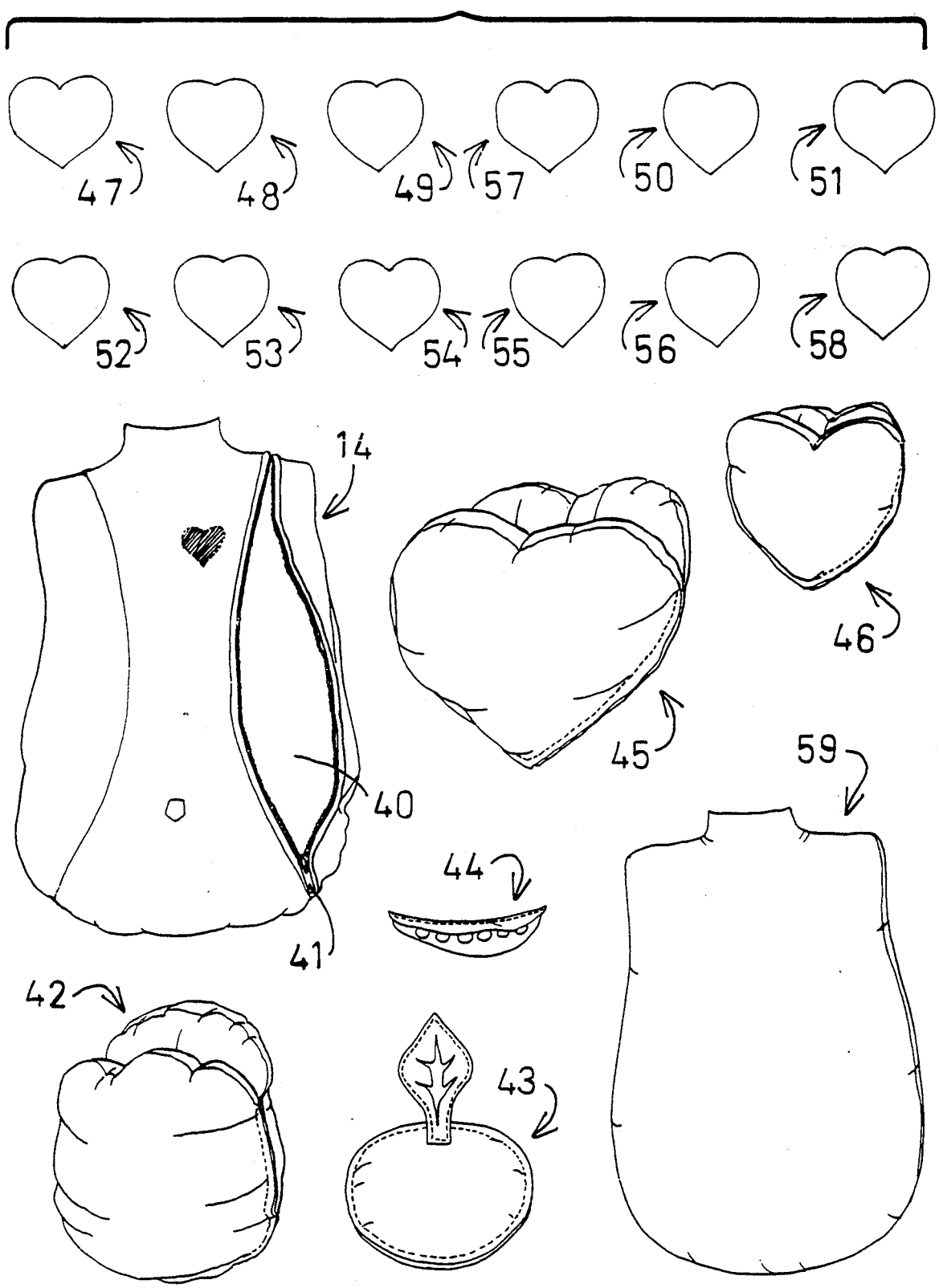
FIG. 4 is an exploded frontal elevation of the torso with the cavity open and all of the contents removed therefrom

The torso 14, as seen in FIG. 4, has a body cavity 40 that is accessed by a zipper 41. Within this cavity 40 is a pink fabric pocket type sack 42 representing the belly. Within the belly 42 is a fabric shape representing an orange 43 and a fabric shape representing a peapod 44. Within the torso cavity 40 is a large red fabric heart shaped pocket sack 45, which represents the red heart of love. Inside this red heart of love 45 is a smaller gold fabric heart shaped pocket sack 46, which represents the golden heart of truth. Within the golden heart of truth 46 are twelve printed cards 47 to 58, with questions designed to remind the child or adult to seek out the internal cause of feelings located within the body. The printed fabric torso shaped object 59 is the internal organ insert and represents all other body cavity organs.

The right arm 16, as shown in FIG. 5a, contains a cavity 60 which is accessed through a zippered enclosure 61. It contains one printed fabric insert 65 representing the inner arm. The construction of the left arm is a mirror image of the right arm. The right leg 17, as shown in FIG. 5b, contains a cavity 70 which is accessed through a zippered enclosure 71. It contains one printed fabric insert 75 representing the inner leg. The construction of the left leg is a mirror image of the right leg.

An example for use with any upset; headache, bellyache, crying, unexplained tiredness, depression, or aggressive behavior (which can all be symptoms of unexpressed anger, confusion, worry or fear). Have the person in discomfort expose the head cavity 20 and remove the mind 23. Take out the emotions or feelings 29 to 39 and let the person choose the one that best represents his feelings or emotions. Ask the person to place the feeling or emotion 29 to 39 in the body location of the doll 10, that best describes where his discomfort is, including a hurt memory 25 or a hurt feeling in his heart 45 or any physical location throughout the body of the doll 10. After the emotion 29 to 39 is in place, have the person access the torso cavity 40 and remove the red heart of love 45 and within that heart you will find the golden heart of truth 46. Remove all of the printed cards 47 to 58 from this heart and the therapist or parent can ask the questions that they feel will most assist the person needing help. These cards each contain a basic question to ask the child or adult to ask themselves:

Am I afraid of something/someone? 47
Did something/someone make me sad? 48
Did something/someone make me mad? 49
Have I told the truth? 50
Did something/someone make me feel like crying? 51
Have I done anything to hurt someone? 52
Have I said anything to hurt someone? 53
Is there someone I didn't love today? 54
Can I forgive that person now? 55
Have I not loved myself today? 56
Can I love myself now? 57
Can I let go of may pain now? 58

For instance, the child has a chronic bellyache. The parent or therapist gives the child the doll 10 and instructs the child to open the head cavity 20 by using the zipper 21 and take out the mind sack 23. The child is instructed to remove the objects representing emotions 29 to 39 and take the one most resembling how he feels. The child chooses the grey frown 33. The next instruction is to place the grey frown 33 on the painful area of the body. The child accesses the torso cavity 40 using the zipper 41. He takes the belly 42 out and places the grey frown 33 in the belly 42. Next the child is instructed to remove the large red heart 45 and take out the small gold heart 46. Then the parent or therapist removes all twelve printed cards 47 to 58 from this heart 46. The questions on these provide a comforting, non threatening way to approach communication about the upset. The child responds to cards 47, 48, 49, 51, 54, 55, 57, and 58. Now the child is ready to "process the problem". After talking and thinking things out, the therapist or parent discovers that the child (a kindergarten student) has been intimidated by an older student, had his lunch money taken and he was threatened that if he were to tell anyone, he would be beaten up. After the discovery of the problem, the child is instructed to take the imagination 27 out of the mind 23 and remove a bandage 28. He then removes the grey frown 33 from the belly and replaces it with the bandage 28. The grey form is returned to the mind 23 and all of the parts of the doll 10 are reassembled and all of the openings are closed. The doll is now dressed and ready for play.

Given the right tools to work with, the child will communicate. Love and understanding are at the top of the list of tools needed in processing and releasing withheld communication. The most powerful tool to allow a person to "let go" of unexpressed anger or withheld communication that has been misplaced in the body is truth.

The doll 10 is also very personal to the child. With many places to hide or keep special objects, such as pictures of Mom or Dad or the family pet, in the memory 25 or in the heart 45. Anything can be hidden anywhere in the doll, making it a great play companion.

It is obvious that various types of fasteners could be utilized in lieu of zippers, for example, fabric fastening strips, such as VELCRO TM strips, buttons, snaps and the like. While the invention has been particularly shown and described with reference to a preferred embodiment thereof, it will be understood by those in the art that various changes in form and details may be made therein without departing from the spirit and scope of the invention.

What is claimed is:

1. A doll for therapeutic communication of feelings and emotions comprising:
    a body having a head, torso, arms and legs;
    at least one of said head, torso, arms, and legs having at least one cavity with a corresponding opening allowing access to said cavity and means for closing said opening;
    means, insertable into said cavities, for expressing human emotions, said means comprising a plurality of forms, each form having an emotional connotation; and
    fabric bandages, said bandages being stored in a cavity in said head.

2. A doll as recited in claim 1 wherein a form insertable into a cavity in said head comprises a means for connoting a human mind, said form comprising a first fabric pocket.

3. A doll for therapeutic communication of feelings and emotions comprising:
    a body having a head, torso, arms and legs;
    at least one of said head, torso, arms, and legs having at least one cavity with a corresponding opening allowing access to said cavity and means for closing said opening;
    means, insertable into said cavities, for expressing human emotions, said means comprising a plurality of forms, each form having an emotional connotation; and
    printed cards containing questions used in attitudinal healing and for assisting communication of unexpressed human feelings and emotions.

4. A doll as recited in claim 3 wherein a form insertable into a cavity in said head comprises a means for connoting a human mind, said form comprising a first fabric pocket.

5. A doll as recited in claims 2 or 4 wherein a form insertable into a cavity in said head comprises a second fabric pocket, said second fabric pocket connoting a human memory.

6. A doll as recited in claims 2 or 4 wherein a form insertable into a cavity in said head comprises a third fabric pocket, said third fabric pocket connoting a human imagination.

7. A doll as recited in claims 2 or 4 wherein said first fabric pocket holds a second fabric pocket, said second fabric pocket connoting a human memory.

8. A doll as recited in claim 7 wherein said first fabric pocket holds a third fabric pocket, said third fabric pocket connoting a human imagination.

9. A doll as recited in claims 1 or 3 wherein one of said plurality of forms comprises a fabric form generally shaped as a jagged lightening bolt, said jagged lightening bolt connoting human feelings of anger, fear, confusion, anxiety, and worry.

10. A doll as recited in claims 1 or 3 wherein one of said plurality of forms comprises a fabric form generally shaped as smiling lips, said smiling lips connoting human feelings of joy.

11. A doll as recited in claims 1 or 3 wherein one of said plurality of forms comprises a fabric form generally shaped as frowning lips, said frowning lips connoting human feelings of sadness, unhappiness, confusion, and worry.

12. A doll as recited in claims 1 or 3 one of said plurality of forms comprises a fabric form generally shaped as a small stuffed heart, said heart connoting human feelings of love, caring, and compassion.

13. A doll as recited in claims 1 or 3 wherein one of said plurality of forms comprises a fabric form generally shaped as a light bulb, said light bulb connoting ideas and thinking.

14. A doll as recited in claims 1 or 3 wherein one of said plurality of forms comprises a fabric form generally shaped as a freeform star, said star connoting unidentified feelings and inspiration.

15. A doll as recited in claims 1 or 3 wherein a cavity in said torso receives a fabric pocket in a belly area of said torso, said fabric pocket receiving said forms connoting human emotions and feelings.

16. A doll as recited in claims 1 or 3 wherein a cavity in said torso receives a heart shaped fabric pocket, said heart shaped pocket connoting a heart of love, said heart of love pocket receiving said forms connoting human emotions and feelings.

17. A doll as recited in claim 16 wherein said heart of love pocket has a smaller heart shaped fabric pocket connoting a heart of truth, said heart of truth pocket further comprising a container for holding printed cards.

18. A doll as recited in claims 1 or 3 wherein a cavity in said torso receives a heart shaped fabric pocket, said heart shaped pocket connoting a heart of truth, said heart of truth pocket further comprising a container for holding printed cards.

19. A doll as recited in claims 1 or 3 further comprising fabric forms connoting interior parts of said arms.

20. A doll as recited in claims 1 or 3 further comprising fabric forms connoting interior parts of said legs.

21. A doll as recited in claims 1 or 3 further comprising a fabric form connoting an internal organ of said torso.

22. A doll as recited in claim 1 wherein said bandages are stored in a fabric pocket, said fabric pocket representing a human imagination.

23. A doll for therapeutic communication of feelings and emotions comprising:

a body having a head, torso, arms and legs;

at least one of said head, torso, arms, and legs having at least one cavity with a corresponding opening allowing access to said cavity and means for closing said opening;

means, insertable into said cavities, for expressing human emotions, said means comprising a plurality of forms, each form having an emotional connotation; and a fabric form generally shaped and colored as an orange.

24. A doll for therapeutic communication of feelings and emotions comprising:

a body having a head, torso, arms and legs;

at least one of said head, torso, arms, and legs having at least one cavity with a corresponding opening allowing access to said cavity and means for closing said opening;

means, insertable into said cavities, for expressing human emotions, said means comprising a plurality of forms, each form having an emotional connotation; and a fabric form generally shaped and colored as a peapod.

25. A method of communicating human feelings and emotions comprising the steps of:

forming a body of a doll having a torso, arms, legs, and head;

locating cavities in said torso, arms, legs, and head with means for closing said cavities; for receiving fabric forms assigning human emotions and feelings to said fabric forms, and inserting said fabric forms connoting said human emotions and feelings into said cavities to communicate said emotions and feelings.

26. A method of communicating human feelings as recited in claim 25 further comprising the step of communicating healing of human emotions by replacing at least one of said forms connoting said emotions and feelings with a fabric form generally shaped as a bandage.

27. A method of communicating human emotions as recited in claim 26 further comprising the step of locating a cavity in said head and locating at least one of said fabric bandage forms in the cavity in said head.

28. A method of communicating human feelings as recited in claim 25 further comprising the step of locating a generally heart shaped pocket containing printed cards relating to human feelings in a cavity in said torso, said heart shaped pocket connoting a heart of truth, and communicating thoughts relative to said feelings and emotions by answering questions on said printed cards.

29. A method of communicating human feelings as recited in claim 28 further comprising the step of replacing said forms connoting human emotions and feelings with a fabric form generally shaped as a bandage in response to said questions, in order to communicate healing of said emotions and feelings.

* * * * *